United States Patent [19]

Fromson et al.

[11] 4,103,226
[45] Jul. 25, 1978

[54] APPARATUS FOR GAUGING THE TEXTURE OF A CONDUCTING SURFACE

[75] Inventors: Robert E. Fromson, Wilkins Township, Allegheny County; James N. Brecker, Mt. Lebanon; Lanson Y. Shum, Delmont, all of Pa.

[73] Assignee: Westinghouse Electric Corp., Pittsburgh, Pa.

[21] Appl. No.: 723,269

[22] Filed: Sep. 15, 1976

[51] Int. Cl.² ............................................ G01R 27/26
[52] U.S. Cl. .................................................. 324/61 R
[58] Field of Search ................ 324/61 R, 61 P, 65 R; 361/280, 281; 73/105, 104

[56] References Cited

U.S. PATENT DOCUMENTS

| 2,649,579 | 8/1953 | Alexander | 324/61 P |
| 2,721,976 | 10/1955 | Wojciechowski | 324/61 R |
| 3,243,701 | 3/1966 | Strand | 324/61 R |
| 3,387,776 | 6/1968 | Stillwell et al. | 324/61 R |
| 3,400,331 | 9/1968 | Harris | 324/61 R |
| 3,426,272 | 2/1969 | Griffin | 324/61 P |
| 3,519,922 | 7/1970 | Nash et al. | 324/61 R |
| 3,678,378 | 7/1972 | Trott et al. | 324/61 R |
| 3,761,810 | 9/1973 | Fathauer | 324/61 R |
| 3,764,899 | 10/1973 | Peterson et al. | 324/61 R |
| 3,805,150 | 4/1974 | Abbe | 324/61 R |

FOREIGN PATENT DOCUMENTS

| 1,125,249 | 8/1968 | United Kingdom | 324/61 P |

*Primary Examiner*—Stanley T. Krawczewicz
*Attorney, Agent, or Firm*—R. G. Brodahl

[57] ABSTRACT

A capacitance gauging apparatus is described for monitoring the texture or flatness of a conductive surface. Conductive plate members, resiliently supported on a flexible substrate, provide a probe to measure the texture of a surface to be monitored, the surface itself forming the other plate of a capacitor. The capacitance probe is electrically energized and connected to a monitoring circuit. As the insulated probe rests on the conducting surface, the resulting capacitance changes the frequency of the monitoring circuit. The monitoring circuitry counts the pulses within a period, the number of pulses being proportional to the surface texture, i.e., the higher the number, the coarser the surface texture, and conversely. The period of counting is set such that the surface texture may be displayed directly in microinches or micrometers.

20 Claims, 12 Drawing Figures

TEXTURE – NO WAVINESS

TEXTURE – WITH WAVINESS

TEXTURE OF EXTERNAL RADIUS

TEXTURE OF INTERNAL RADIUS 4,103,226

APPARATUS FOR GAUGING THE TEXTURE OF A CONDUCTING SURFACE

BACKGROUND OF THE INVENTION

1. Field of the Invention

This invention relates to capacitance gauge apparatus for the direct measurement of surface texture.

2. Description of the Prior Art

The utilization of electrical capacitance techniques for monitoring surface texture is broadly old and appears to have been first suggested by J. Perthen "Ein neues Verfahren zum Messen der Oberflachengute durch die Kapazitat eines Kondensators," J. Maschinenbau Betrieb. 1936 (December), 669. A general theoretical treatment of the subject of capacitance gauging appears in the Proc. Instn. Mech. Engrs. 1967-68, Paper 31, entitled "Surface Finish Assessment by an Electrical Capacitance Technique" by K. F. Sherwood and J. R. Crookall.

The British Ministry of Defense has developed an electrical capacitance device, covered by British Pat. No. 818,345, which uses a spring mounted rigid, small area probe as one element of the capacitor. This arrangement does not appear to produce good discrimination.

The apparatus of the instant invention proposes to use a different type capacitance circuit and probe wherein a plate member is resiliently supported so as to better conform to the undulations of the surface being monitored. Additionally, a novel cooperating circuit distinguishes between capacitance magnitudes in the order of a fraction of a picofarad and provides for accurate accumulation of the discharge pulses which are generated as the capacitance probe measures the conductive surface, the texture of which is to be evaluated.

SUMMARY OF THE INVENTION

Apparatus is provided for gauging the texture or flatness of a conductive surface. Capacitance means are arranged in spaced relationship to, and forming with the conductive surface, a variable capacitance as the capacitance means rests on the surface. The capacitance means is resiliently supported on a substrate. Means are provided for energizing the capacitance means. Means are coupled to the energizing means for providing a datum potential. Means are coupled with the capacitance means and with the datum potential means for deriving a discharge pulse each time the datum potential is exceeded by the accumulated charge on the capacitance means. Means for totalizing are coupled with the deriving means for counting the pulses over a time period, the summed number of pulses received during said time period being a function of the texture of the incremental surface being then measured.

DESCRIPTION OF THE EMBODIMENTS

Figure 1A:
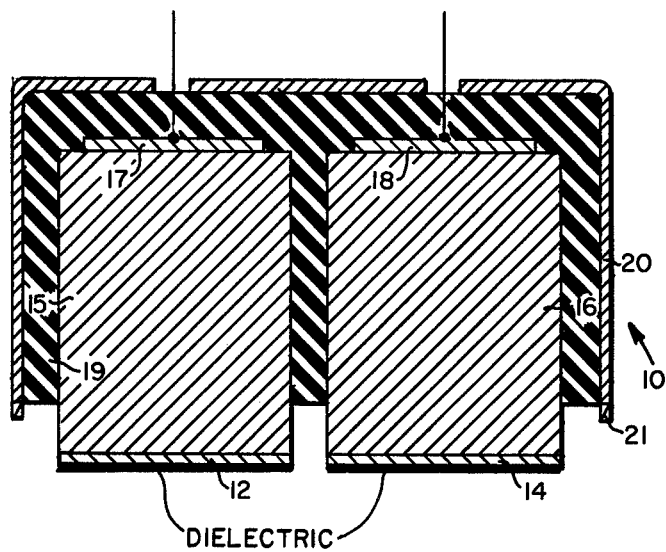
FIG. 1A is a front elevational view of the capacitance probe in accordance with a first embodiment of the invention.
Figure 1B:
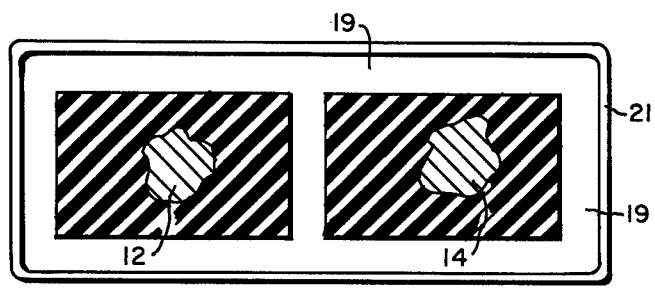
FIG. 1B is a bottom cross sectional view of the capacitance probe shown in FIG. 1A.
Figure 1C:
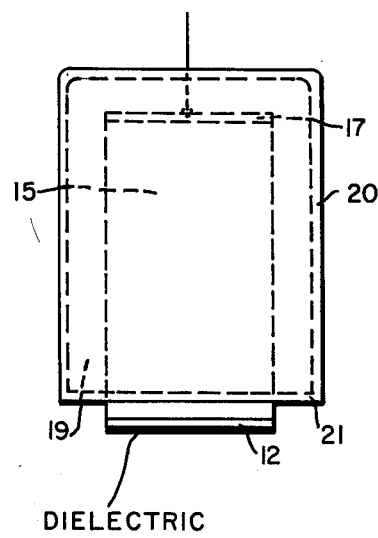
FIG. 1C is a side elevational view of the capacitance probe shown in FIG. 1A.
Figure 2A:
FIGS. 2A, 2B, 2C and 2D are diagrams used in explaining the operation of the embodiment of FIGS. 1A, 1B and 1C.
Figure 2B:
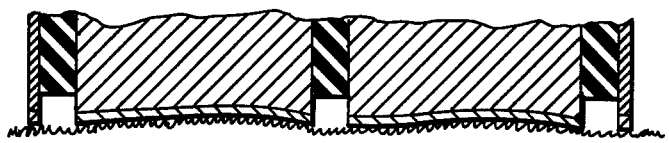
Figure 2C:
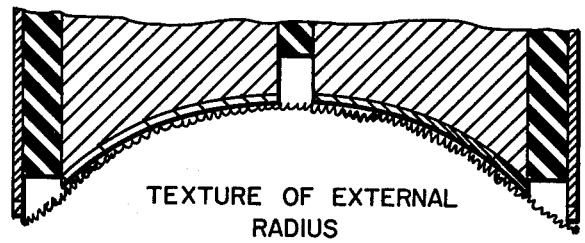
Figure 2D:
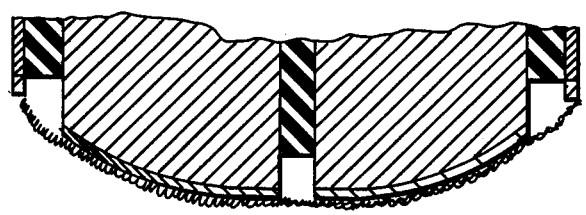
Figure 3A:
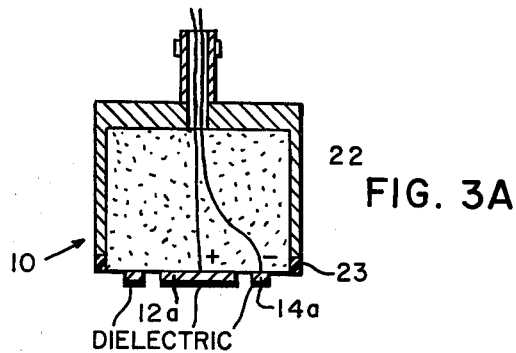
FIG. 3A is a front elevational view of the capacitance probe in accordance with a second embodiment of the invention.
Figure 3B:
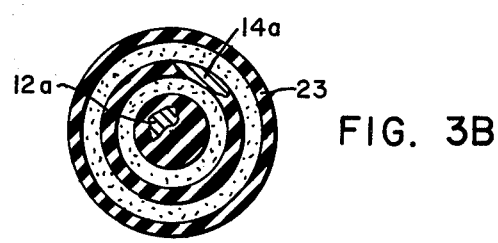
FIG. 3B is a bottom cross-sectional view of the capacitance probe shown in FIG. 3A.

The mechanical portion 10 of the gauging means is depicted in a first embodiment in FIGS. 1A, 1B and 1C and in a second embodiment in FIGS. 3A and 3B.

Initially considering the first embodiment, first and second plate members 12, 14 are mounted on conductive elastomers 15, 16 respectively by means of conductive adhesive. Electrical contact with plate members 12, 14, is obtained by means of contacts 17, 18, conductively secured to elastomers 15, 16. Insulating material 19 isolates the elastomers 15, 16 from the metallic case 20. An insulated stop 21 is provided for the metallic case 20.

The plates 12 and 14 are thin gauge shim stock steel, 0.001 to 0.002 inches thick that will readily conform to the surface to be measured. In some applications where waviness is to be included in the users overall assessment of the surface, plates 12, 14 (12a, 14a) are rendered non-conforming by reason of making these plates thicker perhaps in the order of 0.010 inches or thicker. This gives greater emphasis to the waviness aspects of the surface which may be more useful for the user's applications.

The arrangement of FIGS. 1A, 1B and 1C enables easy replacement of the plate members when required. Additionally, the support of the plates 12, 14, on elastomers 15, 16 insures uniform pressures with repeated texture measurements, when the insulated rim 21 of the case 20 contacts the surface to be measured. This is illustrated in FIGS. 2A through 2D for the different application modes viz texture no waviness, texture with waviness and textures of external and internal radii respectively.

Referring now to FIGS. 3A and 3B, first and second plate members 12a and 14a are mounted on a flexible substrate 22. The substrate itself is supported within a cylindrical housing which is provided with suitable openings to permit ingress by wires to plate members 12a and 14b respectively. An insulated stop is provided at 23. The flexible substrate may be a foamed elastomer or any other readily deformable material. The plates 12a, 14a are flexible conductive material. Thin shim stock is an excellent material. A thin controlled dielectric layer is needed between the plates 12a, 14a (12, 14) and the subject conductive surface, and in one embodiment FORMVAR was used. (FORMVAR, is a blend of a polyvinyl formal and phenolic resin). In the practical embodiment here illustrated the plate 12a is in the order of ¼ inch in diameter, and the housing is slightly more than ½ inch in diameter.

Figure 4:
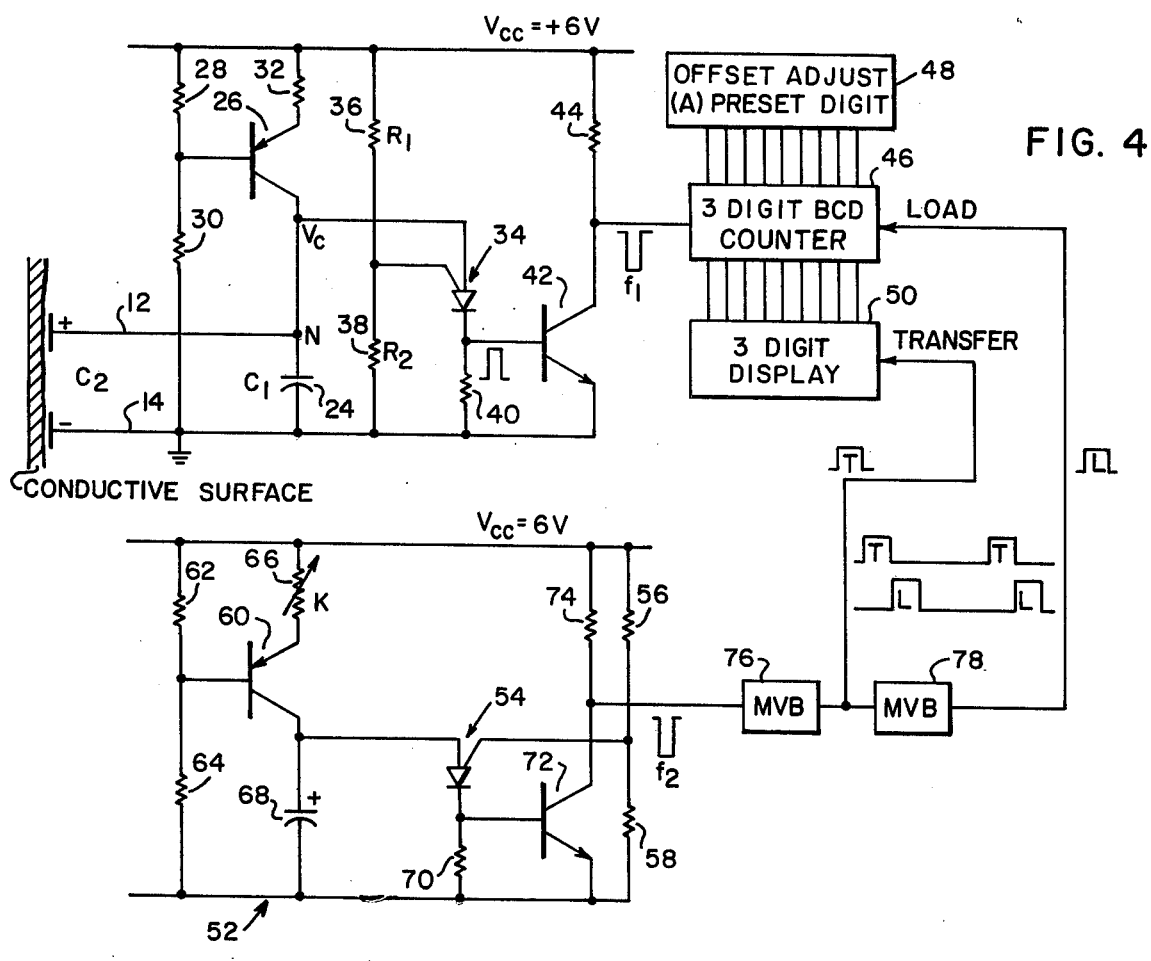
FIG. 4 is an electrical schematic of the surface texture monitoring circuitry in accordance with the invention.

The electronic portion of the gauging apparatus is shown in FIG. 4. The members 14 and 14a are grounded. A capacitor 24 is connected between the first plate member 12 (or 12a) and second plate member 14 (or 14a). A constant current source, in this embodiment transistor 26, is serially connected with capacitor 24 as shown, so that plate 12 (or 12a) is charged positively, and member 14 (or 14a) is negatively charged. Serially connected resistors 28, 30, connected between $V_{cc} = +6V$ and ground, provide base bias for the transistor 26. The resistor 32 is connected between $+V_{cc} = 6V$ and the emitter of the transistor 26. A programmable unijunction transistor is indicated generally at 34. Bias for the gate of unijunction transistor 34 is provided by serially connected resistors 36, 38. The anode of unijunction 34 is connected to plate member 12 (or 12a). The output of the transistor 34 is taken across resistor 40 and applied to the base of inverting transistor 42; the collector of transistor 42 is connected to $+V_{cc}$ through resistor 44.

The output pulses from the collector of transistor 42 are applied to a three digit binary coded decimal (BCD) counter 46. The counter 46 is loaded by an offset adjust 48 which is adjustable by a digital thumbwheel. The counter 46 is applied to a three digit display 50 which is periodically updated, as will be explained.

The counter 46 and the digital display 50 are operated in timed sequence by means of load (L) and transfer (T) signals.

The load (L) and transfer (T) signals are generated by the cooperation of an oscillator 52 and serially connected multivibrators 76 and 78. In the oscillator circuit a programmable unijunction transistor, indicated generally at 54, has its gate connected between serially connected resistors 56, 58. A constant current source, transistor 60, has its base connected to the midpoint of serially connected resistors 62, 64. A variable resistor 66 connecting the emitter of transistor 60 with the voltage source $+V_{cc} = 6V$ provides an adjustment of the factor K in the calibration of the gauging apparatus, as will presently be explained. A capacitor 68 is connected serially with the transistor 60. The programmable unijunction transistor 54 includes an output resistor 70 connected to its cathode. The output resistor 70 is connected to the base of transistor 72, the emitter of which is connected to $+V_{cc}$ through resistor 74. The output from transistor 72, taken from the emitter, is applied to trigger multivibrator 76; the output of the latter is the transfer signal T applied to the three digit display 50. The output of MVB 76 also triggers the output of multivibrator (MVB) 78 which provides the load signal L which is applied to the counter 46.

OPERATION

As the capacitance gauging means measures the conductive surface, the variable capacitance which it presents is integrated over an area $$V_c = 1/C \int dt \quad (1)$$

where $C$ = the resultant capacitance $$C = C_1 + C_2 \quad (2)$$

where $C_1$ = the capacitance of capacitor 24, and
$C_2$ = the effective capacitance of the means 10.

The voltage at node N, FIG. 4, varies then with the variable capacitance of the conductive surface. The gate of the programmable unijunction transistor 34 is at the potential:

$$V_{cc} \frac{R_2}{R_1 + R_2} = V_{cc} \frac{\text{resistor 38}}{\text{resistor 36} + \text{resistor 38}}$$

Figure 5:
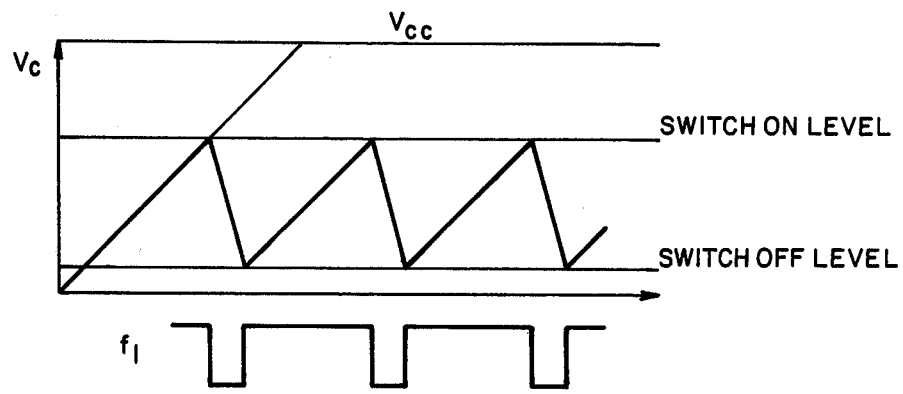
FIG. 5 depicts voltage waveforms used in explaining the operation of the circuitry of FIG. 4; and, FIG. 6 is a diagram used in explaining how the capacitance apparatus of the invention is calibrated for direct reading.

This potential is the switch On potential indicated in FIG. 5. The voltage at N, i.e., $V_c$ charges up to the switch On level, and then the capacitors discharge through the anode to cathode path of unijunction transistor 34. This causes a negative-going pulse to appear across resistor 40 which is then inverted by transistor 42 to produce $f_1$. The process is repetitive as the measured capacitance is charged and discharged. The oscillator 52 provides a sampling time period. When the pulse $f_2$ triggers MVB 76, a transfer pulse T is sent to the digital display 50 to update the contents. The pulse T is in the order of $1\mu$ sec. The pulse T also triggers MVB 78 which sends pulse L approximately $1\mu$ sec. later. The load signal L loads in the offset A to the counter. If A is the number $-243$, the counter counts up from $-243$ to zero up through the positive scale of numbers. These numbers are sent to a storage in the digital display 50 which is updated upon receipt of the transfer or update signal T.

Thus, if the pulses $f_1$ applied to counter 46 represent some number, say 343, and the number A is $-243$, then $343 - 243 = 100$ which will be digitally displayed on display 50.

The number in the display 50 can be calibrated as some deviation from known standards, or it can be used to display the texture of the surface directly in microinches or some other dimension.

Figure 6:
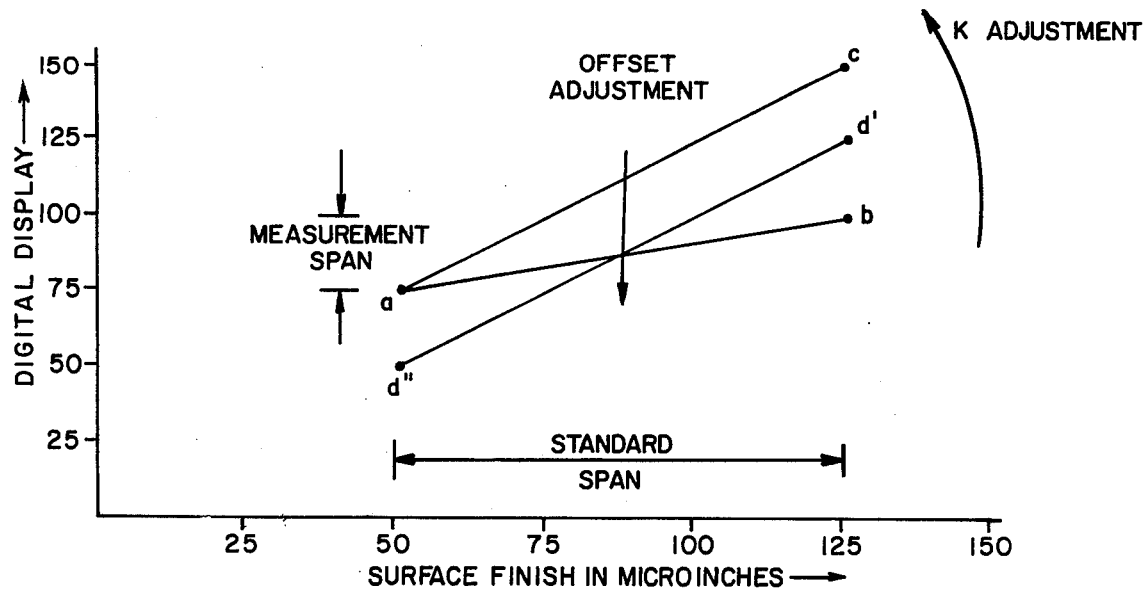

The apparatus of the invention can be calibrated to read directly, for example, in microinches. Referring now to FIG. 6 assume that the capacitance gauging apparatus is tested with a standard surface of say $50\mu$ inches and the display reads 75 (point $a$). The apparatus is next tested with a second standard surface of say $125\mu$ inches and the display reads 100 (point $b$). The difference between the standard span 75 and the measurement span 25 is 50. With the probe still on the $125\mu$ inch standard (point $b$), the K factor is adjusted until the display reads 150, i.e., 100 plus the difference between the standard span and the measurement span or 50. The instrument is now at point C. Next with the probe still on the $125\mu$ inch standard the offset factor is adjusted until the display reads 125 (point $d'$). In effect the line a-c has now moved to $d'-d''$ so that a standard of $50\mu$ inches will read 50 in the display (point $d''$). Note that the offset adjusts upper and lower ($d'$ and $d''$) points simultaneously. The capacitance gauging apparatus can now be used to read directly in microinches (or micrometers) if the correct standards are selected.

The gauging apparatus which includes the capacitance gauging means 10 and the circuitry of FIG. 4 can be conveniently packaged and is portable so that an individual engaged in metal-working can quickly gauge the texture of the surface he is preparing, and also the portable unit may be used for quality control checking. The higher the number of the digital display, the coarser the surface texture, and conversely.

What is claimed is:

1. Apparatus for gauging the texture of a conductive surface comprising:
   (a) capacitance means arranged in spaced relationship to an incremental area of said conductive surface and forming with said conductive surface a variable capacitance when said means is in spaced insulated relationship thereto for gauging the texture of said conductive surface;

(b) means for energizing said capacitance means;

(c) means coupled to said energizing means for providing a datum potential;

(d) means coupled with said capacitance means and said datum potential means, for deriving a discharge pulse each time said datum potential is exceeded by the charge on said capacitance means; and (e) means coupled with said deriving means for counting said pulses over a time period, with the summed number of pulses received during said time period being a function of the texture of said incremental area.

2. Apparatus according to claim 1, wherein said capacitance means comprises flexible mounting means, a first plate member having a dielectric coating thereon, a second plate member having a dielectric coating thereon, said first and second plate members being arranged in spaced relationship and supported on said flexible mounting means, said dielectric coatings being contiguous with said conductive surface.

3. Apparatus according to claim 2, wherein said dielectric coatings are FORMVAR.

4. Apparatus according to claim 2 wherein the flexible mounting means are conductive elastomers and said first and second plate members comprise flat, thin gauge conductive material of quadrilateral configuration arranged in spaced, cooperating relationship on said elastomers.

5. Apparatus according to claim 4 wherein said quadrilateral configuration is rectangular.

6. Apparatus according to claim 2, wherein said first plate member is circular, and the second plate member is annular in configuration and secured on said flexible mounting means concentric with respect to said first member.

7. Apparatus according to claim 2, including a cylindrical housing for said flexible mounting means, said first member is circular and said second plate member is annular in configuration and concentrically arranged with said first member on said flexible mounting means.

8. Apparatus according to claim 1, wherein said energizing means comprises a charged capacitor.

9. Apparatus according to claim 2, wherein said energizing means comprises a constant current source and a capacitor, said capacitor being connected between said first and said second plate members, said constant current source being connected serially with said capacitor to provide a charge thereon.

10. Apparatus according to claim 1, wherein said deriving means is a programmable unijunction transistor, having an anode, a grid, and a cathode, the grid being connected to said datum potential means, wherein when said datum potential is exceeded, said capacitance means discharges through the anode-cathode path of said unijunction transistor.

11. Apparatus according to claim 1, wherein said totalizing means comprised counting means and timing means, said counting means receiving said pulses, said timing means being connected to said counter means to provide a sampling time period signal, so that the output of said counter means is enabled during said sampling period.

12. Apparatus according to claim 1, wherein said totaling means comprises offset digital adjust means, counter means, digital display means, and timing signal means, said counter means being connected to receive said pulses and the digital adjust output of said offset digital adjust means, and having its output connected to said digital display means, said timing signal means providing transfer and load time signals, said transfer signal being connected to said digital display means, said load signal being applied to said counter means, whereby when said load signal is received by said counter means, said digital adjust output is summed with said pulses, and when said transfer signal is received by said digital display means, the contents thereof are updated.

13. Apparatus according to claim 12 wherein said timing means is adjustable so that the slope of the calibration curve can be modified so as to correspond with the slope obtained by gauging the texture of standard specimens, and in combination with the adjustment of said offset adjust digital means, the surface roughness of a specimen to be tested can be gauged and displayed by a number on said digital display means which reads directly in linear units.

14. Apparatus for gauging a predetermined characteristic of a conductive surface, said apparatus comprising capacitance means including a conductive plate member arranged in a spaced relationship with an incremental area of said surface and capacitivety coupled to said surface, which incremental area is determined by said plate member and provides a variable capacitance as determined by said surface characteristic for gauging said characteristic of the surface, and dielectric means resting on said surface and positioned between said plate member and said surface for determining said spaced relationship.

15. The apparatus of claim 14, with said dielectric means providing a fixed capacitance in relation to the gauging of said characteristic.

16. The apparatus of claim 14, with said conductive plate member being flexible to conform with the waviness of said surface.

17. The apparatus of claim 14, with said conductive plate member having a thickness of at least 0.010 inch.

18. The apparatus of claim 14, including
means resiliently supporting said plate member and controlling the plate member to conform with the shape of said surface.

19. The apparatus of claim 16, with said predetermined characteristic being the texture of the conductive surface.

20. The apparatus of claim 17, with said predetermined characteristic being the flatness of the conductive surface.

* * * * *